United States Patent [19]
Black et al.

[11] 3,970,158
[45] July 20, 1976

[54] TOOTH LOADING FOR EARTH BORING BITS

[75] Inventors: Bill Adby Black; Johannes Gerardus Leon Eenink, both of Houston, Tex.

[73] Assignee: Hughes Tool Company, Houston, Tex.

[22] Filed: Apr. 28, 1975

[21] Appl. No.: 572,545

[52] U.S. Cl. .................................. 175/410; 403/361
[51] Int. Cl.² .......................................... E21C 13/00
[58] Field of Search ............. 175/410, 374; 299/79, 299/91, 92, 93, 94; 403/333, 334, 343, 361

[56] References Cited
UNITED STATES PATENTS

| | | | |
|---|---|---|---|
| 1,428,415 | 9/1922 | Brossoit | 175/410 |
| 2,101,376 | 12/1937 | Voigtlander | 175/410 |
| 2,673,716 | 3/1954 | Avery | 175/410 |
| 3,190,380 | 6/1965 | Anderson | 175/410 |
| 3,239,233 | 3/1966 | Stillwagon | 403/343 X |
| 3,382,940 | 5/1968 | Stebley | 175/410 |
| 3,618,683 | 11/1970 | Hughes | 175/410 |
| 3,693,736 | 9/1972 | Gardner | 175/410 |
| 3,791,463 | 2/1974 | Pearson | 175/410 |
| 3,858,671 | 1/1975 | Kita et al. | 175/410 |

*Primary Examiner*—Ernest R. Purser
*Assistant Examiner*—Richard E. Favreau
*Attorney, Agent, or Firm*—Robert A. Felsman

[57] ABSTRACT

Deformable pads are inserted under the hard metal inserts used to form the earth removing teeth of an earth boring bit. The inserts are typically formed of sintered tungsten carbide, with a cylindrical body beveled at the lower end to facilitate insertion into an interferringly sized drilled hole. The volume of the deformable pad or plate is greater than the remaining voids between the hole, the plate and the assembled insert upon initial assembly. Repetitive loading of the insert during drilling deforms the plate to fill said space to evenly distribute stress between the insert and the wall of its retaining hole. A radius between the corner of the wall and bottom of the hole minimizes stress at this corner.

12 Claims, 4 Drawing Figures

TOOTH LOADING FOR EARTH BORING BITS

BACKGROUND OF THE INVENTION

1. Field of the Invention

This invention relates in general to earth boring bits and in particular to improvements in those bits using earth removing teeth formed of hard metal inserts retained in mating holes by interference fit.

2. Description of the Prior Art

Sintered tungsten carbide is shaped to formed earth removing teeth that protrude from interferringly sized holes in steel rotatable cutters of earth boring bits. Similar inserts are used in rotary percussive bits that are struck repetitively by a motor driven hammer. In either type bit high level cyclic stress waves pass repeatedly through the inserts and their supporting metal. As a consequence, insert fractures and fatigue failures in the supporting metal have been problems that occasionally appear, especially when drilling conditions are severe.

SUMMARY OF THE INVENTION

This invention decreases the frequency of insert fracture and fatigue failure in the supporting metal of an earth boring bit by insertion between the insert and the bottom of its mating hole a deformable plate. The corner at the wall and bottom of the hole has a large radius. The resulting volume of relatively malleable material serves to more evenly distribute the stress resulting from the loaded insert across the hole bottom. In addition a pressure is exerted by the deformed pad in the void that otherwise appears adjacent the bottommost line of contact between the insert and hole wall, thereby reducing the stress variation across this bottommost line of contact. Stress concentration is minimized and failures reduced. Additional objects, features and advantages of the invention will become more fully apparent hereinafter.

DESCRIPTION OF THE PREFERRED EMBODIMENT

Figure 1:
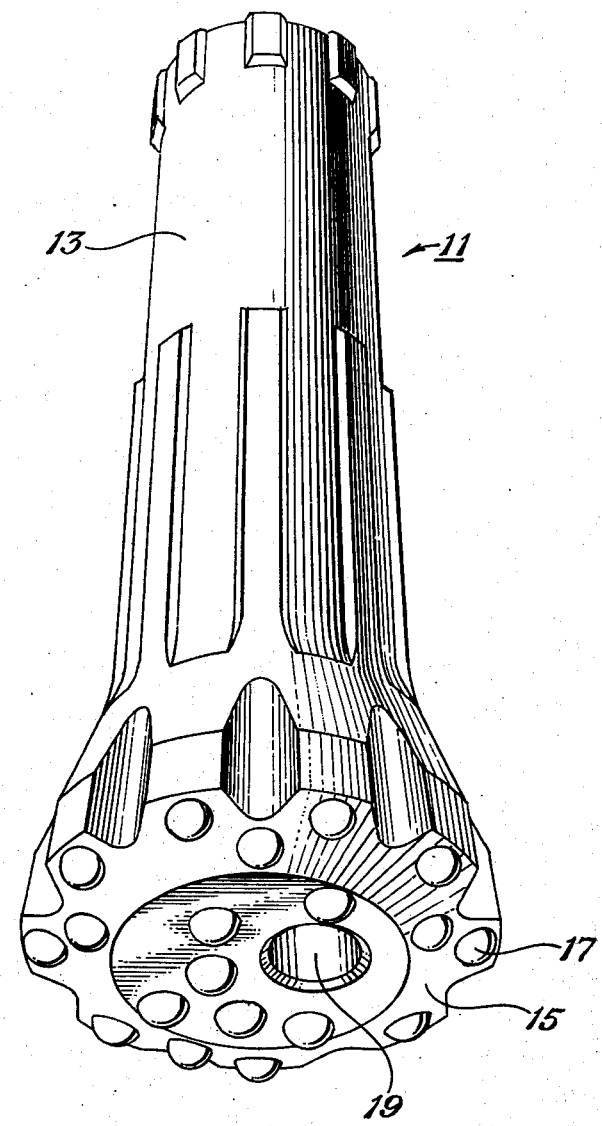
FIG. 1 is a perspective view of a rotary-percussive earth boring bit having hard metal inserts protruding from the body of the bit.

The numeral 11 in the drawing designates a rotary-percussive type earth boring bit having a shank end 13 adapted to be received and retained in a housing (not shown) that includes a motor-driven hammer that periodically strikes the top of the shank end 13. The lower end 15 of the bit has a plurality of hard metal inserts 17, preferably of tungsten carbide, secured by interference-fit in mating holes in the body of the bit. The outermost inserts are generally disposed in a circular heel row. Generally, an air course 19 extends through the bit to blast cuttings away from the bottom of the borehole.

Figure 2:
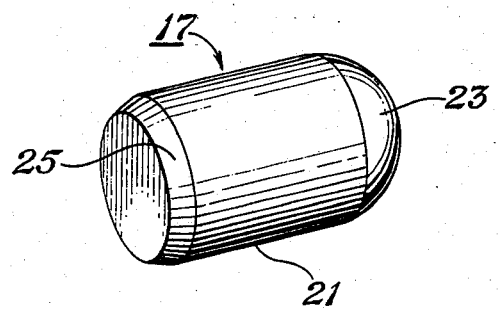
FIG. 2 is an enlarged perspective view of a preferred form of hard metal insert used in the FIG. 1 bit.

FIG. 2 shows a hard metal insert of typical construction which includes a cylindrical body 21, a hemispherical protruding end 33 and a beveled lower end 25.

Figure 3:
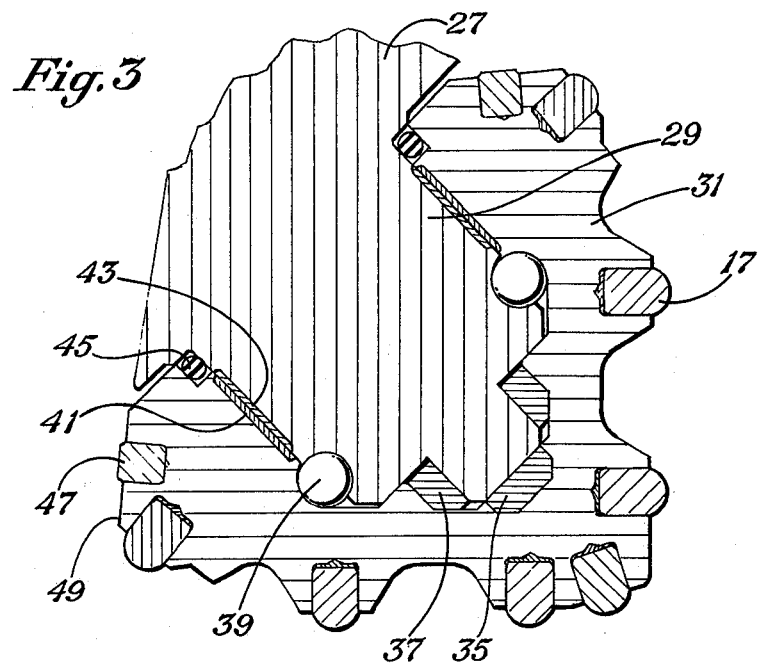
FIG. 3 is a framentary view in longitudinal section of an earth boring bit of the type having hard metal inserts secured in interferringly sized holes in a rotatable cutter supported on a bearing shaft.

In FIG. 3 is shown an earth boring bit of the type using rotatable cones or cutters. In such a bit there are generally three legs 27 having bearing surfaces formed on a cantilevered shaft or pin 29 that rotatably each receives the body 31 of a cutter. Hard metal inserts 17 are retained in interferringly sized holes such that their protruding ends engage the bottom of the borehole for earth removal. The outermost inserts 33 are disposed in a circular heel row in each cutter. A typical bearing configuration is shown which includes a thrust button 35, bushing 37, ball bearings 39. The friction bearing surfaces of the body 31 of the cutter and of the shaft 29 are typically treated with bearing materials as indicated by the numerals 41, 43. Lubrication is sealed inside the bearing area by a suitable seal such as O-ring 45. Gage protecting inserts 47 are also used on many such bits to inhibit wear of the steel gage surface 49 of the body 31 of the cutter, but these are not usually considered as "teeth" and are not subjected to the same forces and stresses as teeth.

Figure 4:
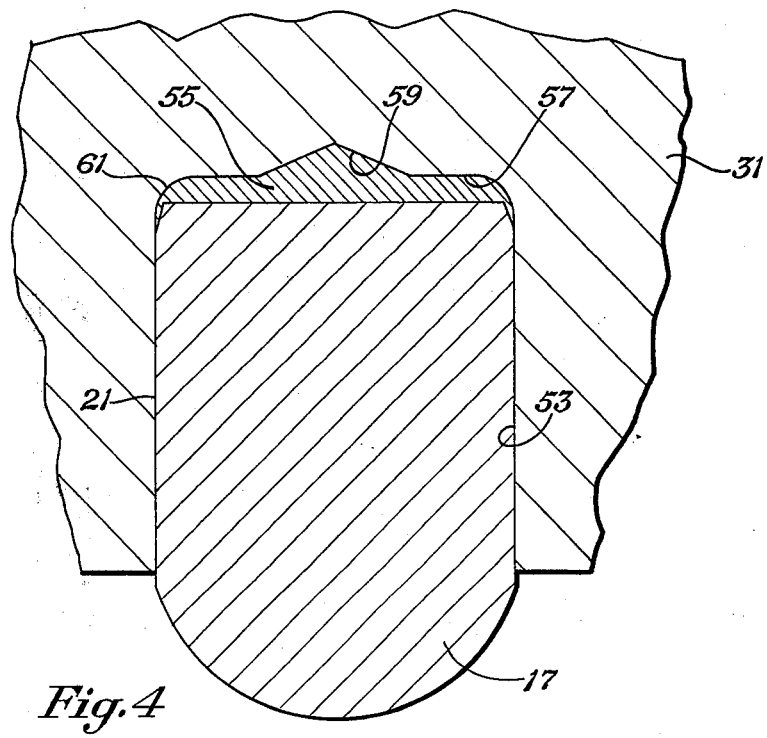
FIG. 4 is an enlarged longitudinal section of a hard metal insert and a portion of the supporting metal having an interferringly sized hole and a deformed plate between the insert and the bottom of the hole.

FIG. 4 is a view in longitudinal section of one of the inserts 17 inserted in an interferringly sized hole of the body of the bit shown in FIG. 1 or in the body of the cutter 31 shown in FIG. 3. The cylindrical wall or surface 21 of the insert 17 and the mating drilled and reamed wall 53 of the hole are sized to have a nominal interference of about 0.002 inch. A typical insert is manufactured of sintered tungsten carbide, a composition of mono and/or ditungsten carbide cemented with a binder selected from the iron group consisting of cobalt, nickel or iron. Cobalt ranging from about 10 to 16 percent, balance tungsten carbide, is presently the most common binder. The exact composition depends upon the usage intended for the tool and its inserts. Typical insert hardness is about 89 Rockwell A.

An initially circular pad 55 is disposed beneath the insert 17 and the bottom 57 of the drilled hole, which typically has a conical break-out 59. The corner 61 has a large radius. The insert is not pressed in with a high enough force during initial assembly to substantially deform the pad 55. Consequently upon initial assembly, there will be remaining voids (not shown) between the insert 17, the pad 55, and the hole bottom and side walls. It has been discovered that during drilling and the consequent repetitive loading of the insert as it periodically engages the bottom of the borehole, deformation of the pad fills the volume or voids between the hole, the pad, and the insert, as shown in FIG. 4. The deformed pad reduces stress concentrations in the vicinity of the hole bottom. A preferred material for the pad is cold formed A.I.S.I. 1010 steel of about 0.062 inch thickness disposed in a drilled and reamed hole of about 9/16 inch diameter. The typical hardness is about 62 Rockwell B.

Typical material to form the rotary percussive body 11 of FIG. 1 is A.M.S. 6418 steel, hardened in the vicinity of the insert hole to about 40 Rockwell C. A typical cutter body 31 of FIG. 3 is formed of A.I.S.I. 4820 steel, hardened in the vicinity of the insert hole to about 40 Rockwell C hardness. The radius 61 is preferably about 1/16 inch. After drilling the pad compresses to a thickness of about 0.050 inch and fills the volume between insert and hole.

In operation, the inserts are forced into the mating holes until they rest firmly against the pads. The volume of the pad is greater than the remaining voids between the hole (sidewall and bottom), the pad, and assembled insert, upon initial assembly. During drilling the repetitive loading of each pad deforms it until the volume or space between the insert and hole bottom is filled. This tends to equalize the stresses in the metal defining the hole and in the insert. The frequency of insert fracture and cone metal fatigue are reduced.

While the invention has been shown in only one of its forms, it should be apparent to those skilled in the art that it is not so limited but is susceptible to various changes and modifications without departing from the spirit thereof.

We claim:

1. An improved earth boring bit comprising a metal body, teeth formed of hard metal inserts secured interferringly in a circular row or drilled holes in the body to engage the bottom of a borehole, a deformable pad under said inserts and in contact with said inserts and the mating associated interferring holes, the volume of the pad being greater than the remaining voids between the hole, the pad, and assembled insert upon initial assembly, and the hardness of the pad being less than that of the metal defining said holes, whereby the pad during drilling and repetitive loading fills said voids between the insert, the pad, and hole.

2. An improved earth boring bit comprising a body, teeth formed of hard metal inserts, some of which are secured interferringly in a circular row of drilled holes having a radius between wall and bottom, a deformable pad under at least the inserts of said circular row, there being a bevel on the lower end of each insert of said circular row, with the volume between the hole and the assembled insert being filled by the pad upon loading.

3. In an earth boring bit comprising a steel body and tungsten carbide inserts secured in drilled holes to form earth cutting teeth, one end of each insert being beveled to assist insertion into a drilled hole and the other end shaped in the form of a tooth to remove earth from the bottom of a borehole, the improvement which comprises a deformable pad under each said insert and in contact with said insert and its mating interferring hole, the hole having a radius between its bottom and sidewall, the volume of the pad being greater than the remaining voids between the hole, the pad, and the assembled insert upon initial asembly whereby upon repetitive loading of the insert during drilling the pad fills said voids.

4. The invention defined by claim 3 wherein said pad is constructed of mild steel.

5. An improved rotary-percussive earth boring bit comprising a metal body, inserts retained by interference-fit in said body in mating holes, some of which form a circular row defining a heel row of inserts which are shaped at one end to assist insertion into said holes and shaped at the other end to define earth removing teeth, a deformable pad under at least said heel row inserts and in contact with said heel row inserts and their interferring holes, each hole having a radius between its bottom and sidewall, the volume of each pad being greater than the remaining voids between the hole, the pad, and the assembled insert upon initial assembly, and the hardness of the pad being less than that of the metal defining said hole such that upon loading the pad fills said voids between the insert, the pad, and the hole.

6. The invention defined by claim 5 wherein said pad is mild steel.

7. An improved rotary cutter earth boring bit comprising at least one rotatable cutter body, inserts retained by interference-fit in said cutter body in mating holes to define earth removing teeth, some of which form a circular row defining a heel row of inserts which are shaped at one end to assist insertion into said holes, a deformable pad under at least said heel row inserts and in contact with said heel row inserts and their interferring holes, which each hole having a radius between its bottom and sidewall, the volume of the pad being greater than the remaining voids between the hole, the pad, and the assembled insert upon initial assembly, and the malleability of the pad being such that upon loading the pad fills said voids between the insert, the pad, and the hole without damage to cutter or insert.

8. The invention defined by claim 7 wherein said pad is mild steel.

9. An improved rotary-percussive earth boring bit comprising a hardened steel body, inserts of sintered tungsten carbide retained by interference-fit in said body in mating holes to define earth removing teeth, some of which for a circular row defining a heel row of inserts which are shaped at one end to assist insertion into said holes, a deformable pad under each said heel row insert and in contact with said insert and its interferring hole, which has a radius between its bottom and sidewall, the volume of each pad being greater than the remaining voids between the hole, the pad, and the assembled insert upon initial assembly, and the malleability and hardness of the pad being such that loading fills said voids between the insert, the pad, and hole with said pad.

10. The invention defined by claim 9 wherein said pad is circular mild steel.

11. An improved rotary cutter earth boring bit comprising plural rotatable hardened steel cutter bodies, inserts of sintered tungsten carbide retained by interference-fit in said cutter bodies in mating holes to define earth removing teeth, each cutter having a circular row of inserts defining a heel row, the inserts being shaped at one end to assist insertion into said holes, a deformable pad under at least said heel row inserts in contact with said heel row inserts and their interferring holes, which each have a radius between its bottom and sidewall, the volume of the pad being greater than the remaining voids between the hole, the pad, and the assembled insert upon initial assembly, and the malleability of the pad being such that upon loading the pad fills said voids between insert and hole without damage to cutter or insert.

12. The invention defined by claim 11 wherein said pad is mild steel.

* * * * *